(12) United States Patent
Kurokawa

(10) Patent No.: US 7,942,539 B2
(45) Date of Patent: May 17, 2011

(54) LIGHT-EMITTING DIODE MODULE FOR INSTRUMENT PANEL

(75) Inventor: Kazumasa Kurokawa, Kariya (JP)

(73) Assignee: DENSO Corporation, Kariya (JP)

( * ) Notice: Subject to any disclaimer, the term of this patent is extended or adjusted under 35 U.S.C. 154(b) by 177 days.

(21) Appl. No.: 12/132,248

(22) Filed: Jun. 3, 2008

(65) Prior Publication Data

US 2008/0316758 A1 Dec. 25, 2008

(30) Foreign Application Priority Data

Jun. 20, 2007 (JP) ................ 2007-162998

(51) Int. Cl.
*G01D 11/28* (2006.01)
*G02B 6/42* (2006.01)
*H01R 13/717* (2006.01)

(52) U.S. Cl. .......... 362/26; 362/362; 362/612; 362/800; 439/620.16

(58) Field of Classification Search .............. 362/23–30, 362/488, 511, 608, 612, 555, 362, 800; 439/490, 439/541.5, 620.15–620.2
See application file for complete search history.

(56) References Cited

U.S. PATENT DOCUMENTS

| | | | | |
|---|---|---|---|---|
| 4,163,428 A * | 8/1979 | Ishikawa | ................ | 116/288 |
| 4,727,648 A * | 3/1988 | Savage, Jr. | ................ | 362/382 |
| 4,935,665 A * | 6/1990 | Murata | ................ | 313/500 |
| 5,481,440 A * | 1/1996 | Oldham et al. | ................ | 362/555 |
| 5,775,791 A * | 7/1998 | Yoshikawa et al. | ................ | 362/625 |
| 6,142,822 A * | 11/2000 | Wu | ................ | 439/490 |
| 6,174,194 B1 * | 1/2001 | Bleicher et al. | ................ | 439/490 |
| 6,227,911 B1 * | 5/2001 | Boutros et al. | ................ | 439/620.18 |
| 6,328,595 B1 * | 12/2001 | Chang | ................ | 439/490 |
| 6,431,906 B1 * | 8/2002 | Belopolsky | ................ | 439/490 |
| 6,623,152 B1 * | 9/2003 | Kroening | ................ | 362/555 |
| 7,329,034 B2 * | 2/2008 | Verdes et al. | ................ | 362/555 |
| 2001/0039140 A1 * | 11/2001 | Fasold et al. | ................ | 439/490 |
| 2007/0170452 A1 | 7/2007 | Kurokawa et al. | | |

FOREIGN PATENT DOCUMENTS

| | | |
|---|---|---|
| JP | 60-66058 | 5/1985 |
| JP | 61-138260 | 8/1986 |
| JP | 2002-353514 | 12/2002 |
| JP | 2005-142412 | 6/2005 |
| JP | 2006-128415 | 5/2006 |
| JP | 2007-208150 | 8/2007 |

OTHER PUBLICATIONS

Japanese Office Action dated Mar. 31, 2009, issued in corresponding Japanese Application No. 2007-162998, with English translation.

* cited by examiner

*Primary Examiner* — Alan Cariaso
(74) *Attorney, Agent, or Firm* — Nixon & Vanderhye P.C.

(57) ABSTRACT

A light-emitting diode module is mounted on an instrument panel of an automotive vehicle for illuminating a scale plate of the instrument panel. The module is composed of a light-emitting diode and a holder for supporting the diode thereon. The holder includes a housing made of molded resin and conductor plates embedded in the housing. The light-emitting diode is mounted in a depressed portion formed in the housing, and the holder is mounted on a circuit board to supply electric power to the light-emitting diode through the conductor plates embedded in the housing. A front surface of the housing and a front surface of the light-emitting diode are made flush with each other so that a flat surface made by both front surfaces is positioned close to a rear surface of the scale plate.

8 Claims, 2 Drawing Sheets

LIGHT-EMITTING DIODE MODULE FOR INSTRUMENT PANEL

CROSS-REFERENCE TO RELATED APPLICATION

This application is based upon and claims benefit of priority of Japanese Patent Application No. 2007-162998 filed on Jun. 20, 2007, the content of which is incorporated herein by reference.

BACKGROUND OF THE INVENTION

1. Field of the Invention

The present invention relates to a light-emitting diode module for illuminating an instrument panel such as an instrument panel of an automotive vehicle.

2. Description of Related Art

An example of a light-emitting diode module for use in an instrument panel of an automotive vehicle is disclosed in JP-A-2006-128415. In the instrument panel, a scale plate is disposed at a front surface of the instrument panel, and a light-conducting plate is overlapped on a rear surface of the scale plate. Light emitted from the light-emitting diode module is introduced into the light-conducting plate from its side portion, and the light is scattered in the light-conducting plate and reflected frontward toward the scale plate. Thus, the scale plate is illuminated.

In the conventional module, since a member supporting the light-emitting diode sticks out toward the scale plate, the scale plate and the light-conducting plate have to be arranged in a particular manner to effectively introduce the light emitted from the light-emitting diode module into the light-conducting plate. For example, a certain space is provided between the scale plate and the light-conducting plate to make a space for accommodating the sticking-out portion of the supporting member. Alternatively, a portion of the scale plate corresponding to the supporting member is projected toward the front side while keeping a close contact between the scale plate and the light-conductive plate.

However, the light introduced into the light-conducting plate is not fully utilized if the scale plate is separated from the light-conducting plate. To compensate the non-efficient utilization of the light, a luminance of the light-emitting diode has to be increased by supplying a higher power to the light-emitting diode, or the number of the light-emitting diodes used has to be increased. On the other hand, if a part of the scale plate is projected frontward, an ornamental design of the instrument will be damaged.

SUMMARY OF THE INVENTION

The present invention has been made in view of the above-mentioned problem, and an object of the present invention is to provide an improved light-emitting diode module, in which light emitted from the module is efficiently utilized for illumination without making a particular space for the module.

The light-emitting diode module according to the present invention is composed of a light-emitting diode and a holder for supporting the light-emitting diode thereon. The holder includes a housing made of a resin material and a pair of conductor plates embedded in the housing. The module is mounted on a circuit board, and electric power is supplied to the light-emitting diode through the conductor plates from the circuit board. The module is disposed in an instrument panel used in an automotive vehicle. Light emitted from the module is incident upon a light-incident surface of a light-conducing plate laminated on a rear surface of a scale plate. The scale plate is illuminated by the light emitted from the module.

The light-emitting diode is disposed in a depressed portion formed in the housing and electrically connected to the conductor plates. A front surface of the housing to be positioned close to a rear surface of the scale plate is made flush with a front surface of the light-emitting diode, so that the module is positioned in the rear space of the scale plate not to extend in the front side beyond a rear surface of the scale plate. The light-emitting diode mounted on the holder is positioned to face a light-incident surface of the light-conducting plate so that the light emitted from the diode is all supplied into the light-conducting plate. The light supplied to the light-conducting plate is reflected there toward the scale plate to illuminate the scale plate.

A width of the depressed portion may be enlarged beyond a width of the light-emitting diode mounted in the depressed portion so that soldering conditions of the light-emitting diode to the conductor plates are visible from outside. The front surface of the housing may be enlarged so that the module is easily carried by a vacuum tool in a process of mounting the components on the circuit board. Projections may be made on a bottom surface of the depressed portion so that the light-emitting diode is firmly held at a right position in the depressed portion. The housing may be divided into a front portion and a rear portion, both being mechanically connected by conductor plates, so that a single conductor plate is embedded in the housings by insert-molding and the single plate is divided into two conductor plates after molding through a space between the front housing and the rear housing.

According to the present invention, the light emitted from the light-emitting diode module is efficiently utilized for illuminating the scale plate, and the module is properly contained in the rear space of the scale plate in the instrument panel. Other objects and features of the present invention will become more readily apparent from a better understanding of the preferred embodiments described below with reference to the following drawings.

DETAILED DESCRIPTION OF THE PREFERRED EMBODIMENTS

Figure 1:
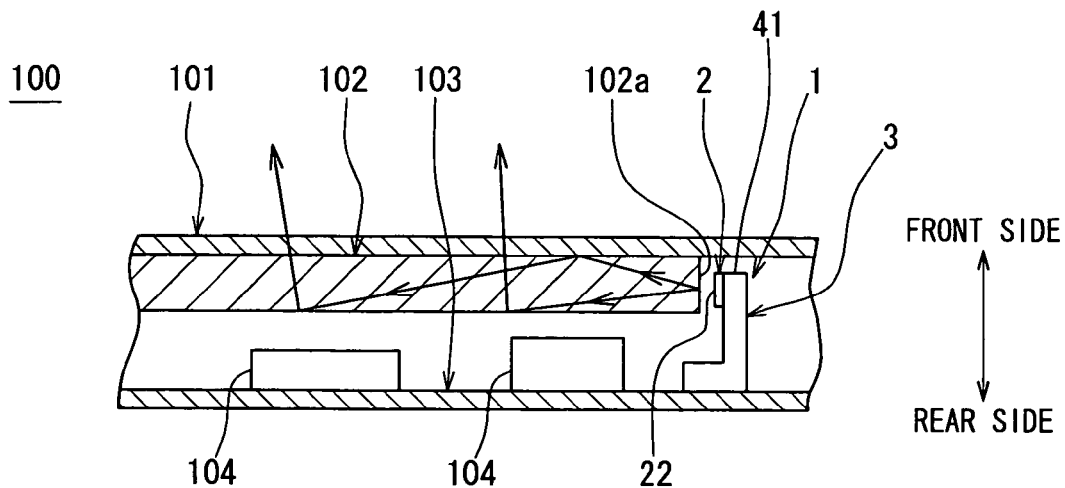
FIG. 1 is a partial cross-sectional view showing an instrument panel, in which a light-emitting diode module according to the present invention is used.

A first embodiment of the present invention will be described with reference to FIGS. 1-3. FIG. 1 shows a combination meter 100 disposed in an instrument panel of an automotive vehicle. A light-emitting diode module 1 is used in the combination meter for illuminating a scale plate 101. The combination meter includes various meters such as a speedometer, indicating devices and warding lamps. A front side of the combination meter, i.e., a side facing a driver, and a rear side that is opposite to the front side is indicated by an arrow in FIG. 1.

A scale plate 101 is disposed at the front side of the combination meter. The scale plate 101 is made of a material such as a transparent resin material, and scales for the speedometer or other instruments are formed on its front or rear surface by printing or the like. A light-conducting plate 102 made of a transparent resin material is disposed on the rear side of the scale plate 101 in a close contact therewith. Light emitted from a light-emitting diode module 1 is incident upon a light-incident surface 102a and enters into the light-conducting plate 102. The light entered the light-conducting plate 102 is scattered therein and reflected toward the scale plate 101. A circuit board 103, on which the light-emitting diode module 1 and other electronic components are mounted, is disposed at the rear side of the combination meter 100. A base plate of the circuit board is made of a material such as glass-epoxy resin, and electric circuit is printed thereon.

Now, the light-emitting diode module 1 will be described in detail with reference to FIGS. 2 and 3. The light-emitting diode module 1 is composed of a light-emitting diode 2 and a holder 3 for supporting the light-emitting diode 2 thereon. The holder 3 is mounted on the circuit board 103, and electric power is supplied to the light-emitting diode 2 from the circuit board 103. The light-emitting diode 2 is a surface-mounting-type diode having a pair of electrodes 21 and a light-emitting surface 22.

The holder 3 is composed of a housing 4 and a pair of conductor plates 5, each connected to each of the electrodes 21 of the light-emitting diode 2. The housing 4 is made of an insulating material such as a resin material, and the conductor plates 5 are made of a metallic material such as copper. The conductor formed in an L-shape as shown in FIG. 3 is insert-molded in the housing 4. The conductor plate 5 has a first electrode surface 51 that is electrically connected to the electrode 21 of the light-emitting diode 2 and a second electrode surface 52 electrically connected to the circuit hoard 103.

The housing 4 has a front surface 41 (an upper surface in FIG. 3) and a depressed portion 43 open to a side surface 42. The depressed portion 43 is substantially rectangular-shaped (viewed from the side of the housing, i.e., from the left side in FIG. 3) as shown in FIG. 2. The light-emitting diode 2 is disposed in the depressed portion 43, and its electrodes 21 are electrically connected to the first electrode surface 51 of the conductor plates 5 by soldering.

Figure 2:
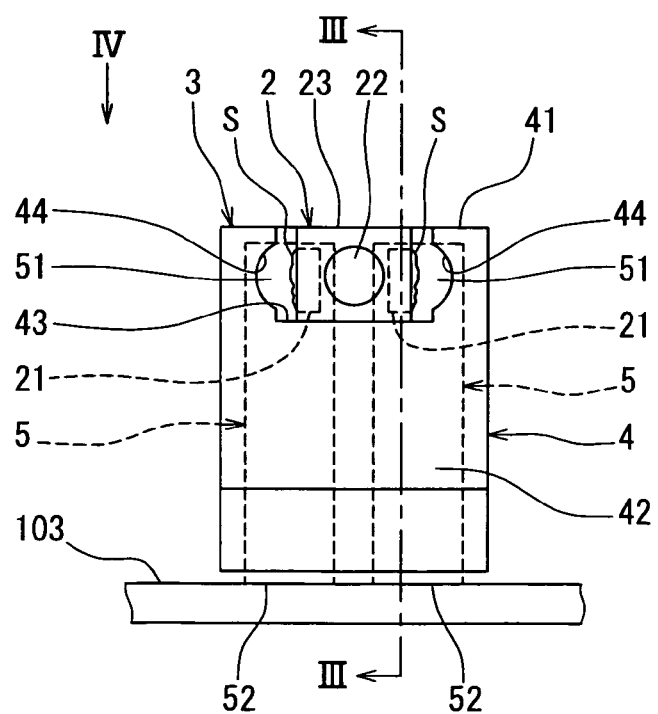
FIG. 2 is a side view showing the light-emitting diode module as a first embodiment of the present invention.

Both sides of the depressed portion 43 are enlarged in a circular shape, forming enlarged portions 44 as shown in FIG. 2. In this manner, the first electrode surface 51 of the conductor plates 5 and the solder S connecting the electrodes 21 to the conductor plates 5 are visible from outside. The light-emitting diode 2 is soldered to the conductor plates 5, and then the conductor plates are connected to the circuit board 103 by soldering. The solder connecting the electrodes 21 of the light-emitting diode 2 may be melted by heat when the conductor plates 5 are connected to the circuit board 103 by soldering. If this occurs, conditions of connection can be checked by directly viewing the solder S through the enlarged portions 44.

Figure 3:
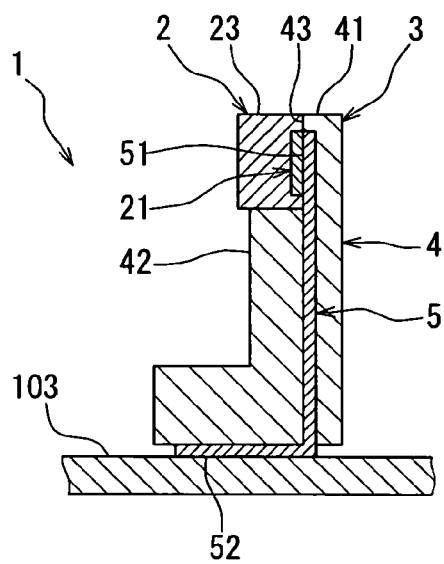
FIG. 3 is a cross-sectional view showing the light-emitting diode, taken along line III-III shown in FIG. 2.

As shown in FIGS. 2 and 3, the front surface 41 of the housing 4 is positioned flush with the front surface 23 of the light-emitting diode 2 (i.e., forming a single flat surface by both surfaces 41 and 23). The light emitted from the light-emitting diode module 1 is directed in parallel to the light-conducting plate 102.

Advantages attained in the first embodiment of the present invention will be summarized below. Since the front surface 41 of the housing 4 and the front surface 23 of the light-emitting diode 2 form a single flat surface, the light-emitting diode module 1 does not interfere with the scale plate 102 even if the scale plate 101 and the light-conducting plate are laminated without making a space therebetween. The light-emitting surface 22 of the light-emitting diode module 1 is positioned within a thickness of the light-conducting plate 102. Accordingly, the light emitted from the light-emitting diode module 1 is fully utilized for illuminating the scale plate 101. Since the enlarged portions 44 are formed at both sides of the depressed portion 43, conditions of soldering the light-emitting diode 2 to the conductor plates 5 are easily inspected by checking the solder S.

Figure 4:
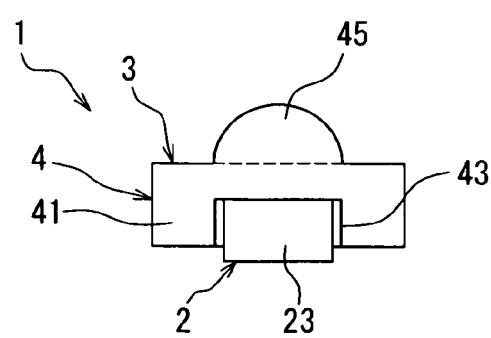
FIG. 4 is a plan view showing a light-emitting diode module as a second embodiment of the present invention, viewed in direction IV shown in FIG. 2.

A second embodiment of the present invention is shown in FIG. 4, which is a front view of the light-emitting diode module, viewed in direction IV shown in FIG. 2. In this embodiment, the housing 4 has an enlarged portion 45 extended in a direction opposite to the depressed portion 43. The enlarged portion 45 is enlarged from the front surface 41 in a shape of a half circle, forming an enlarged flat surface. Other structures are the same as those of the first embodiment. In a process of placing the light-emitting diode module 1 on the circuit board 103 together with other electronic components 104, the light-emitting diode module 1 is carried by a tool attracting the module by vacuum. For this purpose, a front area of the housing 4 has to be sufficiently large relative to the attracting tool head. By providing the enlarged portion 45, the light-emitting diode module 1 can be surely and easily carried.

Figure 5:
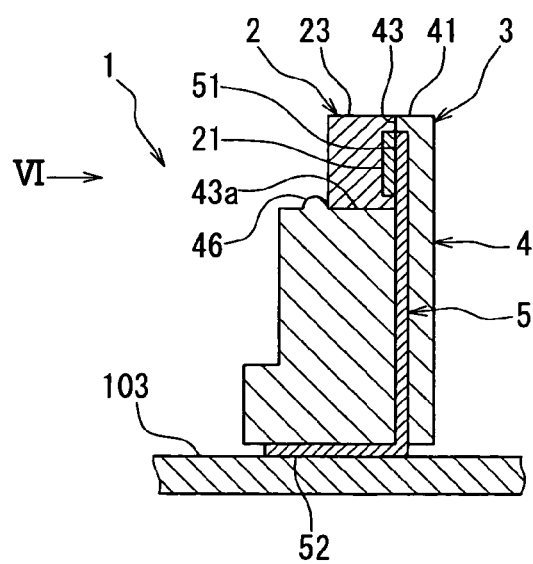
FIG. 5 is a cross-sectional view showing a light-emitting diode module as a third embodiment of the present invention.
Figure 6:
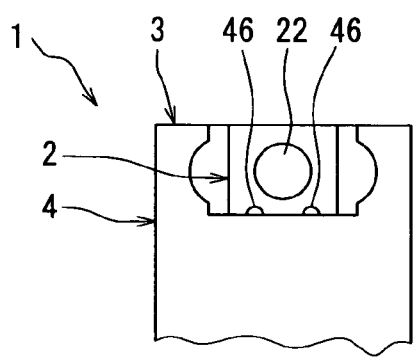
FIG. 6 is a partial side view showing the light-emitting diode module, viewed in direction VI shown in FIG. 5.

A third embodiment of the present invention is shown in FIGS. 5 and 6. The cross-sectional view shown in FIG. 5 is a similar cross-section as shown in FIG. 3. In this embodiment, a pair of projections 46 is formed on a bottom surface 43a of the depressed portion 43. The second electrode surface 52 of the conductor plate 5 is connected by soldering on the circuit board 103 after the light-emitting diode 2 is soldered to the first electrode surface 51 of the conductor plate 5. Therefore, there is a possibility that the solder connecting the light-emitting diode 2 to the conductor plate 5 is partially melted by heat of soldering the second electrode surface 52 on the circuit board 103. If this occurs, the light-emitting diode 2 may move relative to the first electrode surface 51 of the conductor plate 5. By providing projections 46 closely contacting the light-emitting diode 2, the light-emitting diode 2 can be kept at a correct position.

Figure 7:
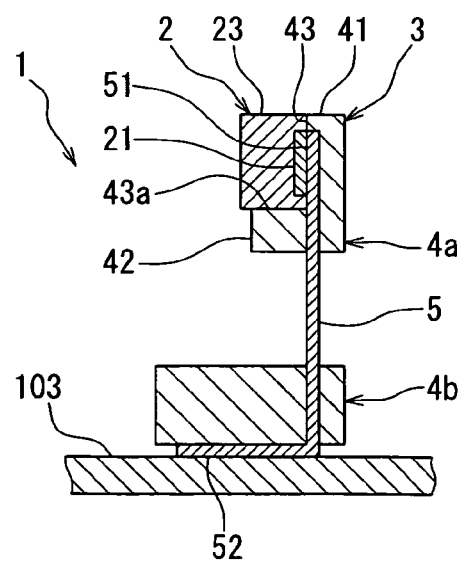
FIG. 7 is a cross-sectional view showing a light-emitting diode module as a fourth embodiment of the present invention.

A fourth embodiment of the present invention is shown in FIG. 7 which shows a similar cross-section as shown in FIG. 3. In this embodiment, the molded housing is separated into two portions, a front portion 4a and a rear portion 4b. Both portions are connected by the conductor plates 5. In a molding process, a single piece of conductor plate, which has separated ends corresponding to the pair of electrodes 21 of the light-emitting diode 2 and a center portion to be exposed from an open space between the housings 4a and 4b, is insert-molded with resin to form the housing having the front housing 4a and the rear housing 4b. Then, the center portion of conductor plate connecting separated ends and exposed to the open space between the front housing 4a and the rear housing 4a is removed to thereby electrically separate the single piece of the conductor plate into the pair of conductor plates 5. In this manner, the holder 3 can be made by insert-molding the single piece of the conductor plate.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A light-emitting diode module for illuminating an instrument panel, comprising:
   a light-emitting diode, and
   a holder for supporting the light-emitting diode, the holder including a housing made of an insulating material and a pair of conductor plates embedded in the housing for supplying electric power to the light-emitting diode from a circuit board on which the holder is mounted, wherein:
   each conductor plate has a first electrode surface connected to the light-emitting diode and a second electrode surface connected to the circuit board;
   the housing has a depressed portion on which the light-emitting diode is mounted, the depressed portion being open to a side of the housing that is parallel to the first electrode surface; and
   a front surface of the housing that is (i) perpendicular to the first electrode surface and is flush with a front surface of the light-emitting diode, forming a single flat surface, and (ii) parallel with the light emitting direction of the light emitting diode.

2. The light-emitting diode module as in claim 1, wherein the light-emitting diode is a surface-mounting-type diode and is surface-mounted on the first electrode surface of the conductor plate.

3. The light-emitting diode module as in claim 1, wherein a projection is formed on a bottom surface of the depressed portion that is parallel to the front surface of the housing, so that the light-emitting diode is fixedly positioned in the depressed portion.

4. The light-emitting diode module as in claim 1, wherein the depressed portion includes enlarged portions enlarging a width of the depressed portion beyond a width of the light-emitting diode, so that solder soldering the light-emitting diode on the first electrode surface of the conductor plate is visible from outside.

5. The light-emitting diode module as in claim 1, wherein the front surface of the housing includes an enlarged surface that is flush with the front surface of the light emitting diode.

6. An instrument panel comprising a transparent light-conducting plate, a scale plate overlapped in front of the transparent light-conducting plate, and the light-emitting diode module defined in claim 1, the light-emitting diode module being positioned at a rear side of the scale plate so that the front surface of the light-emitting diode module is positioned not to extend beyond a rear surface of the scale plate.

7. The light-emitting diode module as in claim 1, wherein the housing is composed of a front housing and a rear housing, both housings being mechanically connected by the conductor plates.

8. The light-emitting diode module as in claim 1, wherein the single flat surface extends in a direction parallel with the surface of the circuit board.

* * * * *